(No Model.) 2 Sheets—Sheet 1.
R. GIBBONS.
COOKING UTENSIL.
No. 541,738. Patented June 25, 1895.
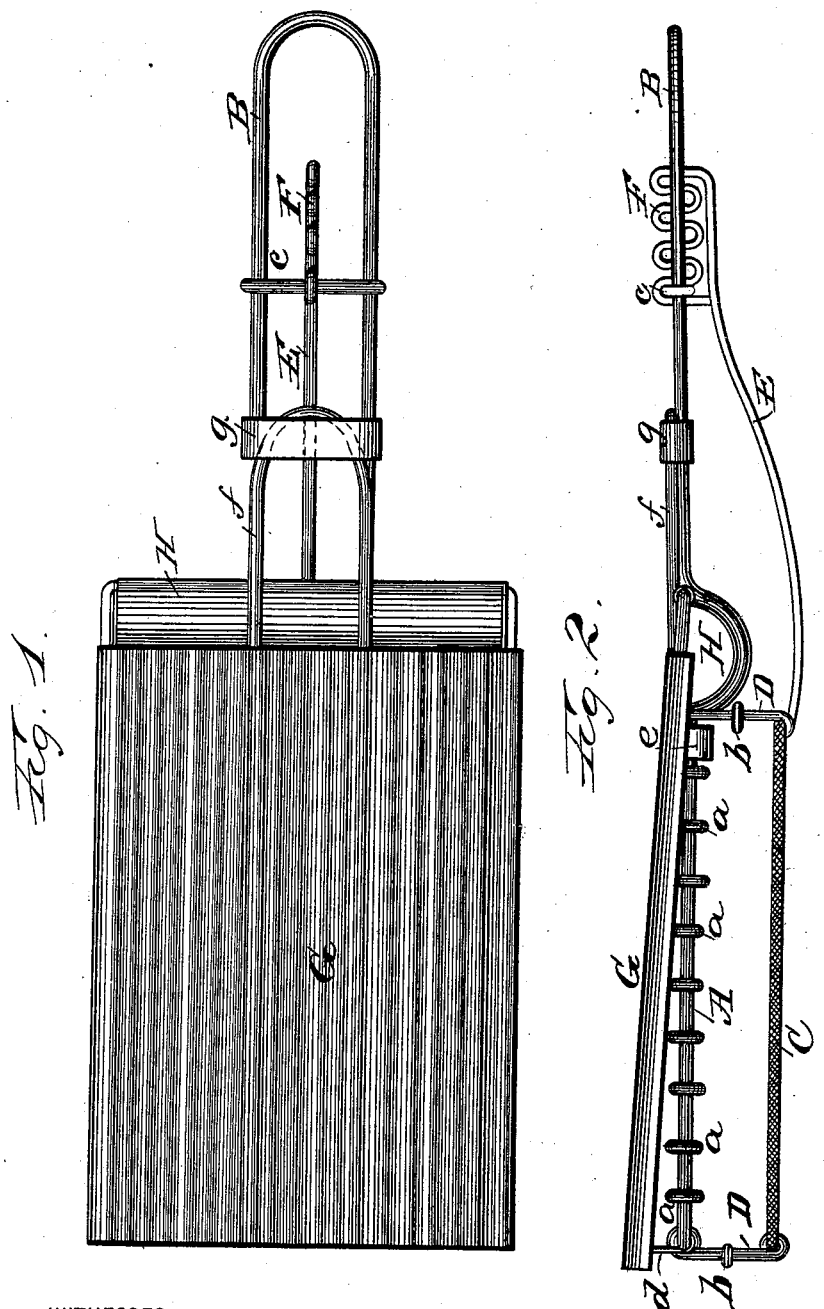
WITNESSES:
INVENTOR
Rodmond Gibbons.

(No Model.) 2 Sheets—Sheet 2.
R. GIBBONS.
COOKING UTENSIL.
No. 541,738. Patented June 25, 1895.
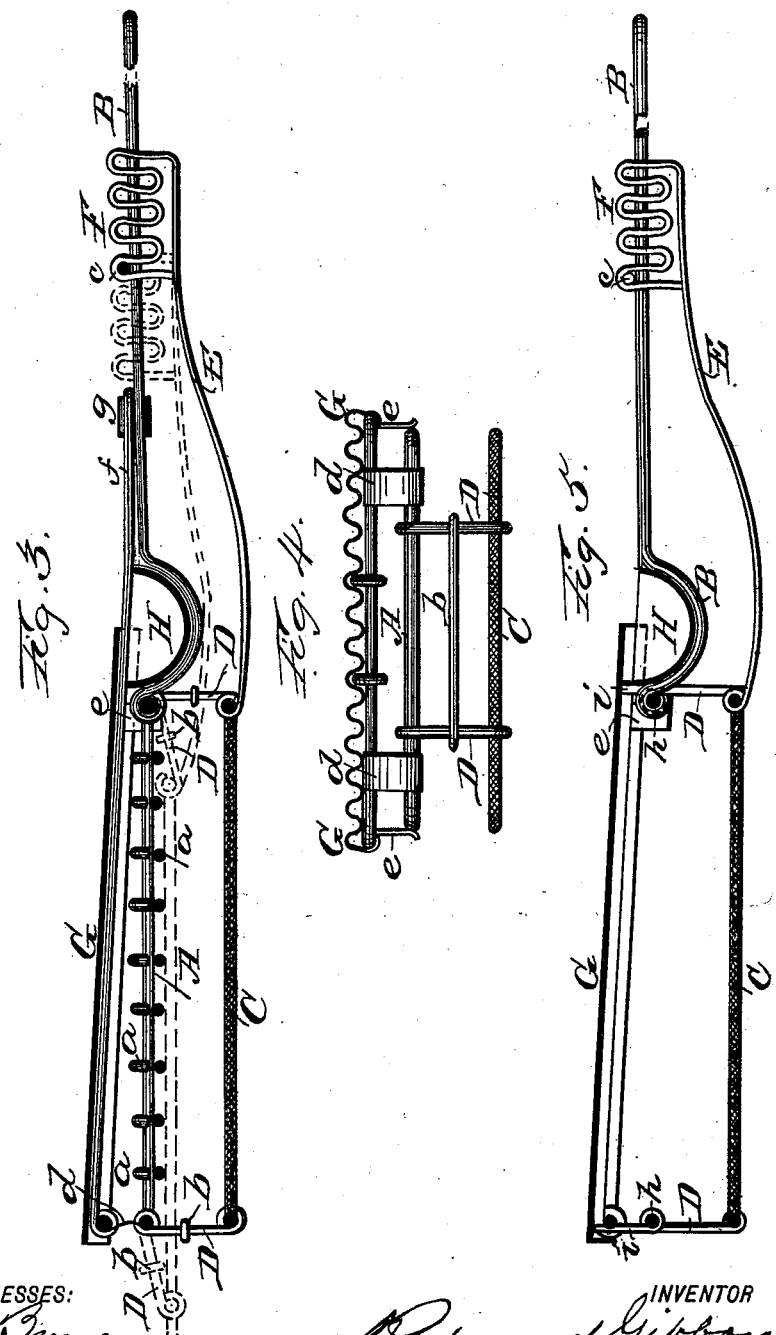
WITNESSES:
H. L. Bennem
Jas. E. Warner
INVENTOR
Redmond Gibbons.

UNITED STATES PATENT OFFICE.

RODMOND GIBBONS, OF NEW YORK, N. Y.

COOKING UTENSIL.

SPECIFICATION forming part of Letters Patent No. 541,738, dated June 25, 1895.

Application filed December 8, 1894. Serial No. 531,281. (No model.)

*To all whom it may concern:*

Be it known that I, RODMOND GIBBONS, of the city, county, and State of New York, have made an invention of certain new and useful Improvements in Cooking Utensils; and I declare that the following, in connection with the accompanying drawings, is a full, clear, and exact description and specification of the same.

My invention has reference to cooking utensils for toasting bread or for grilling meat and other articles, and especially to those which are used in connection with stoves or furnaces in which gas is used as a fuel. In the use of gas and other fuels burning with a flame, it frequently happens that the cooking utensil is set so close to the flame that the latter acts directly upon the object to be cooked, so that such object is frequently scorched at one part before it is properly cooked at other parts. The object of my invention is mainly to obviate this defect by preventing the direct access of flame to the object to be cooked and, at the same time, distributing the heat and thereby tending to equalize its effect upon different portions of such objects.

My invention consists of certain combinations of devices which are specified in the claims at the close of this specification.

In the said drawings, Figure 1 represents a plan of my combined cooking utensil in the best form in which I have thus far embodied my invention. Fig. 2 represents a side view of the same. Fig. 3 represents a vertical longitudinal section of the same, showing also by dotted lines the adjustable capacity hereinafter described. Fig. 4 represents a rear end view of the apparatus, and Fig. 5 represents the longitudinal section of a cooking utensil embodying some parts of my invention without others.

The utensil represented in the said Figs. 1, 2, 3 and 4, is a combined adjustable toaster and griller which may be used for either purpose. It has a rectangular frame A fitted with a handle B by which it may be conveniently manipulated and held over the fire without risk of scorching the hand of the operator. It is fitted with a series of bars *a* which extend across the frame and form a bar-grid, A, *a* upon which the article to be toasted may be supported. Beneath this bar-grid there is a guard C, formed preferably of wire cloth, the object of which is to prevent flame from having direct access to the objects to be cooked and to distribute the heat upon them. The guard C is connected with the frame by means of feet or links D, and these links are movable upon the frame above and upon the guard beneath, so that the latter may be swung upon the links to adjust it to greater or less distances from the object to be cooked, as circumstances may render expedient. I prefer also to connect the two end links D rigidly by a brace *b* so as to prevent them from wabbling sidewise. In order that the guard may be conveniently adjusted and held in the desired adjusted position, it has connected with it an adjusting rod E terminating, at its end which is farthest from the guard, in means for locking it in the position to which it may be adjusted, and the locking means which I prefer to use is the corrugated lock F—any one of the notches of which can be engaged with a cross-bar *c* secured to the handle B of the utensil. The engagement of any one of the said notches with the said cross-bar locks the guard in the position to which it may be adjusted relatively to the article to be cooked.

When articles are to be cooked from which fat or other liquid exudes during cooking, a corrugated plate-grid G is employed. I prefer to combine this corrugated plate-grid with other parts of the utensil in such manner that it is removable; its end which is farthest from the handle being fitted with two hook-form links *d*, one near each end of its sides, to engage with the end of the frame A, and its end which is nearer the handle being fitted at each side with a lug *e* so that the frame A is embraced between them. This corrugated plate-grid also terminates, at its end nearest the handle, in a gutter-formed receptacle H. From this construction it follows that the ridges of the corrugated plate-grid support the article to be cooked substantially in the same way as a series of bars, while the corrugations between the ridges form a series of gutters which catch any liquid that may exude from the article being cooked and deliver it to the gutter-formed receptacle; and, in order that this delivery may be facilitated, I prefer to make the links or connections *d* that are farther from the handle long enough to raise that end of the corrugated plate-grid higher from the guard beneath than the end which is nearer the handle, so that when the utensil is set upon the furnace or stove, with the guard C level or thereabout, the corrugated plate-grid will be slightly inclined to insure the running of the liquid to the receptacle H near the handle.

In order to secure the corrugated plate-grid in its position with the capacity of removal in case an article is to be toasted, I prefer to fit it with a loop or shank $f$ which laps upon the handle and to make it secure thereto by means of a movable slide $g$ which is fitted to slide upon the side-bars of the handle of the utensil. When this slide is withdrawn from the loop or shank $f$, the corrugated plate-grid G may be detached from the residue of the utensil.

The utensil thus far described constitutes a combined toaster and griller. When employed for grilling meat, it should be used in the complete condition represented in the drawings as, when meat is placed upon the corrugated plate-grid, fat or juice exuding from it is prevented from passing directly downward to the furnace beneath and is collected in the gutter-formed receptacle. In this condition of the utensil, the guard C performs its office as an interceptor of flame and a distributer of heat, directly in combination with the corrugated plate-grid; because the bars $a$, being separated by wide intervals, have no material effect upon the distribution of the heat or its upward passage to the corrugated plate-grid. When on the other hand the combined utensil is to be employed for cooking or toasting articles such as bread or sliced vegetables, which do not exude liquids, the slide $g$ is drawn back, the corrugated plate-grid is removed and the article to be cooked is placed directly upon the bar-grid, A $a$. In this condition of the utensil, the guard C operates directly in connection with the bar-grid to intercept flame and to equalize the distribution of heat. The adjustable capacity which is given the guard, as previously described, enables it to be adjusted to greater or less distances from the article to be cooked as may be found expedient according to the nature of the article or the character or condition of the fire.

The foregoing description shows that some parts of my invention may be used without others. Thus, when the corrugated plate-grid is removed as above described from the combined utensil, the bar-grid, A $a$ remains combined with the guard. On the other hand, some users may prefer to use the corrugated plate-grid alone, and in this case the utensil may be constructed, as represented in longitudinal section at Fig. 5, with the corrugated plate-grid G made fast to the handle B, and with the guard C beneath connected with the corrugated plate-grid so as to be adjustable thereto, as previously described, and so that the guard may be adjusted and locked in its adjusted position. In this case I prefer to arrange the links D so as to swing upon the two bars $h$ which are fastened to the corrugated plate-grid by means of legs $i$; those which are farthest from the handle B being the longer, so that the corrugated plate-grid will be inclined when the guard C beneath is set level over the furnace.

I claim as my invention—

1. The combination substantially as before set forth of a food holder, an adjustable guard arranged beneath the same, and means for locking the said guard in the position to which it may be adjusted.

2. The combination substantially as before set forth of the bar-grid, the corrugated plate-grid connected removably therewith, the adjustable guard arranged beneath the same, and means of locking the said guard in the position to which it may be adjusted.

Signed at New York city, in the county of New York and State of New York, this 8th day of November, A. D. 1894.

RODMOND GIBBONS.

Witnesses:
W. L. BENNEM,
JAS. E. WARNER.